US012332965B1

United States Patent
Parasnis et al.

(10) Patent No.: US 12,332,965 B1
(45) Date of Patent: Jun. 17, 2025

(54) WEBSITE PERSONALIZATION AND INTERACTIVE ASSISTANT

(71) Applicant: Typeface Inc., Palo Alto, CA (US)

(72) Inventors: Abhay Parasnis, Palo Alto, CA (US); Vishal Sood, Palo Alto, CA (US); Hari Krishna, Palo Alto, CA (US); Kishore Battula, Palo Alto, CA (US)

(73) Assignee: Typeface Inc., Palo Alto, CA (US)

( * ) Notice: Subject to any disclaimer, the term of this patent is extended or adjusted under 35 U.S.C. 154(b) by 0 days.

(21) Appl. No.: 18/783,421

(22) Filed: Jul. 25, 2024

Related U.S. Application Data

(60) Provisional application No. 63/644,385, filed on May 8, 2024, provisional application No. 63/637,254, filed on Apr. 22, 2024, provisional application No. 63/637,258, filed on Apr. 22, 2024, provisional application No. 63/637,277, filed on Apr. 22, 2024, provisional application No. 63/637,266, filed on Apr. 22, 2024, provisional application No. 63/637,275, filed on Apr. 22, 2024, provisional application No. 63/611,006, filed on Dec. 15, 2023.

(51) Int. Cl.
*G06F 16/957* (2019.01)
*G06Q 30/0251* (2023.01)

(52) U.S. Cl.
CPC ..... *G06F 16/9577* (2019.01); *G06Q 30/0271* (2013.01)

(58) Field of Classification Search
CPC .................. G06F 16/9577; G06Q 30/0271
See application file for complete search history.

(56) References Cited

U.S. PATENT DOCUMENTS

| 8,316,381 | B2 | 11/2012 | Fearn et al. |
| 9,501,499 | B2 | 11/2016 | Sanio et al. |
| 11,417,085 | B2 | 8/2022 | Saraee et al. |
| 11,596,867 | B2 | 3/2023 | Snodgrass et al. |

(Continued)

FOREIGN PATENT DOCUMENTS

| WO | WO-2024167650 A1 | 8/2024 |
| WO | WO-2024167651 A1 | 8/2024 |

OTHER PUBLICATIONS

Oppenlaender, Jonas, "Prompt engineering for text-based generative art", arXiv preprint, (Apr. 20, 2022), 7 pgs.

(Continued)

*Primary Examiner* — Cao H Nguyen
(74) *Attorney, Agent, or Firm* — Schwegman Lundberg & Woessner, P.A.

(57) ABSTRACT

Methods, systems, and computer programs are presented to provide a personalized view of webpages and an interactive assistant for exploring website content. One method includes operations for accessing website data of a website, and detecting a request entered by a user in a user interface (UI). One or more blocks for a webpage are generated in response to the request, where generating each block includes constructing a prompt by entering website data, user information, and block information on a prompt template; providing the prompt as input to a Generative Artificial Intelligence (GAI) tool; and utilizing the response from the GAI tool to build the block for the webpage. The method further includes causing presentation on the UI of the webpage including the generated one or more blocks.

20 Claims, 15 Drawing Sheets

(56) References Cited

U.S. PATENT DOCUMENTS

| | | | |
|---|---|---|---|
| 11,809,688 B1* | 11/2023 | Parasnis | G06F 3/04845 |
| 11,922,541 B1 | 3/2024 | Parasnis et al. | |
| 11,928,319 B1 | 3/2024 | Parasnis et al. | |
| 11,995,803 B1 | 5/2024 | Karpman et al. | |
| 12,217,340 B1 | 2/2025 | Parasnis et al. | |
| 2007/0162845 A1 | 7/2007 | Cave et al. | |
| 2008/0215979 A1 | 9/2008 | Clifton et al. | |
| 2015/0248429 A1 | 9/2015 | Pregueiro et al. | |
| 2019/0325088 A1 | 10/2019 | Dubey et al. | |
| 2020/0273062 A1 | 8/2020 | Probell | |
| 2020/0410026 A1 | 12/2020 | Reuter | |
| 2021/0026522 A1 | 1/2021 | Bowen | |
| 2021/0042796 A1 | 2/2021 | Khoury et al. | |
| 2021/0146254 A1 | 5/2021 | Snodgrass et al. | |
| 2021/0224858 A1 | 7/2021 | Khoury et al. | |
| 2021/0382956 A1 | 12/2021 | Reuter | |
| 2022/0148059 A1* | 5/2022 | Faricy | G06F 16/9577 |
| 2022/0198779 A1 | 6/2022 | Saraee et al. | |
| 2023/0143430 A1 | 5/2023 | Vanreusel et al. | |
| 2024/0020863 A1 | 1/2024 | Zhu et al. | |
| 2024/0086648 A1 | 3/2024 | Han et al. | |
| 2024/0127292 A1 | 4/2024 | Estes et al. | |
| 2024/0129601 A1 | 4/2024 | Brdiczka et al. | |
| 2024/0249318 A1 | 7/2024 | Spiegel et al. | |
| 2024/0256337 A1 | 8/2024 | Verma et al. | |
| 2024/0273308 A1* | 8/2024 | Cai | G06F 40/40 |
| 2024/0289396 A1* | 8/2024 | Chrysanthou | G06F 40/186 |

OTHER PUBLICATIONS

U.S. Appl. No. 18/783,413, Corrected Notice of Allowability mailed Oct. 9, 2024, 2 pgs.

U.S. Appl. No. 18/783,413, Corrected Notice of Allowability mailed Nov. 6, 2024, 2 pgs.

U.S. Appl. No. 18/783,413, Notice of Allowance mailed Oct. 1, 2024, 10 pgs.

U.S. Appl. No. 18/783,416, Non Final Office Action mailed Oct. 1, 2024, 13 pgs.

U.S. Appl. No. 18/783,416, Response filed Dec. 23, 2024 to Non Final Office Action mailed Oct. 1, 2024, 29 pgs.

U.S. Appl. No. 18/783,419, Non Final Office Action mailed Oct. 18, 2024, 27 pgs.

U.S. Appl. No. 18/783,419, Response filed Dec. 23, 2024 to Non Final Office Action mailed Oct. 18, 2024, 18 pgs.

U.S. Appl. No. 18/783,424, Final Office Action mailed Dec. 12, 2024, 18 pgs.

U.S. Appl. No. 18/783,424, Non Final Office Action mailed Sep. 24, 2024, 20 pgs.

U.S. Appl. No. 18/783,424, Response filed Nov. 20, 2024 to Non Final Office Action mailed Sep. 24, 2024, 13 pgs.

Kumar, Madhav, et al., "Generative AI and Personalized Video Advertisements", Available at SSRN 4614118, (2023), 17 pgs.

Smolinski, Pawel, et al., "Towards completely automated advertisement personalization: an integration of generative AI and information systems", 31st International Conference on Information Systems Development (ISD2023), Lisbon, Portugal, (2023), 10 pgs.

Wang, Yuntao, et al., "A Survey on ChatGPT: AI-Generated Contents, Challenges, and (Solutions)", IEEE Open Journal of the Computer Society, vol. 4 (2023), (2023), pp. 280-302.

"U.S. Appl. No. 18/783,419, Final Office Action mailed Jan. 27, 2025", 33 pgs.

"U.S. Appl. No. 18/783,424, Response filed Feb. 12, 2025 to Final Office Action mailed Dec. 12, 2024", 24 pgs.

"U.S. Appl. No. 18/783,416, Final Office Action mailed Feb. 12, 2025", 17 pgs.

* cited by examiner

**INNOVATIVE *by* DESIGN** — 804

The emblematic Perpetual Calendar watch 808 — 806

THE ICONIC NEWATCH POLO COLLECTION NOW WELCOMES FOR THE FIRST TIME A MECHANICAL PERPETUAL CALENDAR WATCH - AN EMBLEMATIC COMPLICATION IN WHICH NEWATCH HAS DEVELOPED CONSIDERABLE EXPERTISE, ALREADY DEPLOYED IN SOME OF ITS OTHER WATCH LINES. A "PERPETUAL CALENCAR" WATCH GIVES THE DATE, WEEKDAY, MONTH AND USUALLY MOON PHASES WHILE AUTOMATICALLY TAKING THE EXACT NUMBER OF DAYS IN THE MONTH, AND THE CYCLE OF LEAP YEARS, INTO ACCOUNT. ACCORDING TO THE GREGORIAN CALENDAR, WHICH WE USE TODAY, ANY YEAR THAT IS DIVISIBLE BY 4, IS A LEAP YEAR HOWEVER, IF IT CAN ALSO BE DIVIDED BY 100, IT IS NOT A LEAP YEAR.

[DISCOVER MORE] — 810

Typeface.AI: Your Personalized Path to Innovation

| Leveraging State-of-the-Art AI Models to Boost Performance Marketing Results | Customized AI for Your DTC Retail Brand | Protect Your Data with Customized AI for Your Brand | Tailored for Your Top Marketing Platforms |
|---|---|---|---|
| As a Performance Marketing Manager at X retailer, we leverage cutting-edge AI technology to optimize your Google search ad campaigns, offering you the most innovative and efficient digital marketing solutions. | Say goodbye to standard AI solutions. Our specialty is customizing outputs to match your direct-to-consumer retail brand's unique tone and style, boosting your performance marketing strategies on platforms like Google's search ads. | As a performance marketing manager at a direct-to-consumer retailer, execute search ads on Google with assurance, knowing that data leakage is prevented through our specialized AI designed specifically for your brand's privacy requirements. | Our AI seamlessly integrates with your preferred marketing tools, allowing you to efficiently manage your Google search ads and enhance your direct-to-consumer retail approach. |

FIG. 9

WEBSITE PERSONALIZATION AND INTERACTIVE ASSISTANT

CROSS-REFERENCE TO RELATED APPLICATIONS

This application claims the benefit of U.S. Provisional Patent No. 63/637,254, filed Apr. 22, 2024, and entitled "Multi-Layer Pre-Generated Content;" U.S. Provisional Patent No. 63/611,006, filed Dec. 15, 2023, and entitled "Pro-actively-Generated Personalized Content Creation;" U.S. Provisional Patent No. 63/637,258, filed Apr. 22, 2024, and entitled "Proactively-Generated Personalized Content Creation;" U.S. Provisional Patent No. 63/637,266, filed Apr. 22, 2024, and entitled "Proactively-Generated Content Creation Based on Tracked Performance;" U.S. Provisional Patent No. 63/644,385, filed May 8, 2024, and entitled "Proactively-Generated Personalized Content Creation;" U.S. Provisional Patent No. 63/637,275, filed Apr. 22, 2024, and entitled "Website Personalization and Interactive Assistant;" and U.S. Provisional Patent No. 63/637,277, filed Apr. 22, 2024, and entitled "Personalized Content Generation." These provisional applications are herein incorporated by reference in their entirety.

TECHNICAL FIELD

The subject matter disclosed herein generally relates to methods, systems, and machine-readable storage media for providing a personalized view of webpages and an interactive assistant for exploring website content.

BACKGROUND

Often, marketers seek to enhance revenue generation through various channels, including the websites of their products or services. These websites serve as a platform to attract users from search engines and provide a shopping platform that is engaging for users. However, current websites fail to tailor their content to individual users, presenting the same information to all visitors regardless of their unique characteristics. This uniform approach limits the potential for user engagement and conversion.

BRIEF DESCRIPTION OF THE DRAWINGS

Various appended drawings illustrate examples of the present disclosure and cannot be considered limiting its scope.

FIG. 6 shows a webpage with computer-generated content, according to some examples.

FIG. 8 shows another webpage with computer-generated content, according to some examples.

FIG. 9 shows examples of generated content for an email, according to some examples.

DETAILED DESCRIPTION

Figure 1:
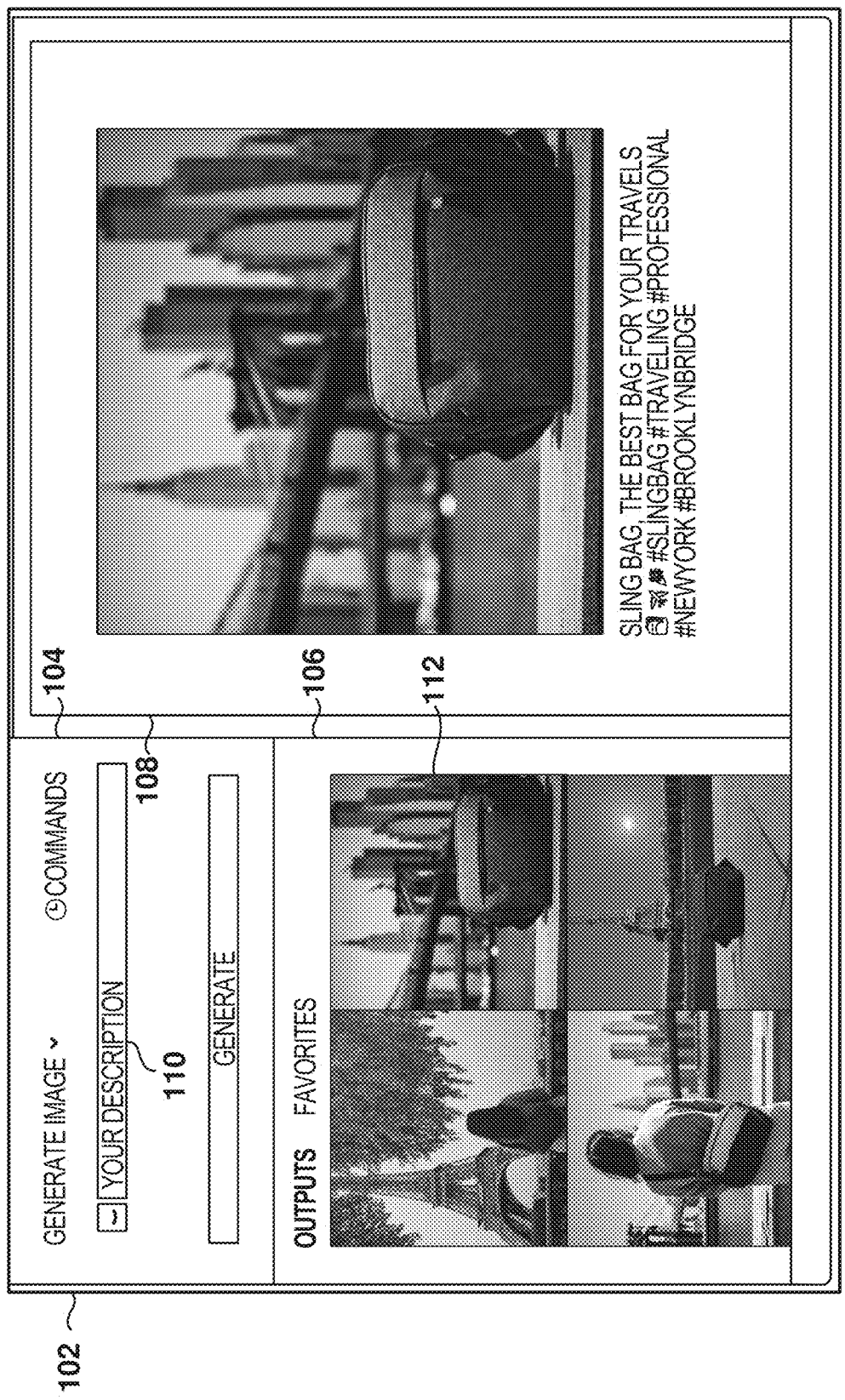
FIG. 1 is a user interface (UI) for a canvas tool to generate multimodal content, according to some examples.

Example methods, systems, and computer programs are directed to provide a personalized view of webpages and an interactive assistant for exploring website content. Examples merely typify possible variations. Unless explicitly stated otherwise, components and functions are optional and may be combined or subdivided, and operations may vary in sequence or be combined or subdivided. In the following description, numerous specific details are set forth to provide a thorough understanding of examples. However, it will be evident to one skilled in the art that the present subject matter may be practiced without these specific details.

The presented techniques address the problem of using the same webpages for all users by delivering personalized website content and an interactive assistant tool. The system tailors the content to the needs and interests of each user to provide relevant and personalized information, increasing the likelihood of converting visiting users into clients.

The present disclosure describes a content-generation system and method for enhancing website personalization to improve user experience and increase conversion rates. The content-generation system addresses the problem of lack of personalized content on websites by delivering personalized content to users based on their unique characteristics, preferences, and intent. This is achieved by leveraging user data, such as demographic information and browsing behavior, to dynamically generate and display personalized content on a website. The personalized content may include targeted product recommendations, customized offers, relevant articles, and other content that aligns with the user's intent and preferences. By tailoring the content displayed on a website to match each user's specific needs and interests, the content-generation system aims to enhance the user experience and increase the likelihood of conversion.

In some aspects, the content-generation system utilizes Generative Artificial Intelligence (GAI) to generate personalized content based on user information. The content-generation system analyzes the user data and utilizes data from previous interactions of similar users with the website to generate content likely to resonate with the current user. The generated content is multimodal and can be applied to various elements of the website, such as headlines, images, or product descriptions, to provide a personalized experience for the user. This personalized approach enhances user engagement and satisfaction.

An interactive assistant is integrated into a website. The interactive assistant leverages a content graph that indexes the website's content to determine the most relevant set of products for the user. The interactive assistant analyzes the user's profile and the indexed content to provide personalized product recommendations and detailed information about the selected products.

Overall, the disclosed system and method enable the delivery of personalized content and the provision of a conversational shopping assistant. These features enhance the user experience, increase user engagement, and improve the effectiveness of websites in delivering relevant information to their visitors.

FIG. 1 is a UI 102 for a canvas tool, also referred to herein simply as canvas, to generate multimodal content, according to some examples. The UI 102 includes a prompt panel 104, the canvas 108, and a variations panel 106.

The prompt panel 104 includes a prompt tool 110 for entering descriptive text for the desired results. The prompt tool 110 is more than a simple input field because the prompt tool 110 includes interactive tools for easy entering input.

After input is entered in the prompt tool 110, the content-generation tool generates results in the variations panel 106 with one or more options that can be selected by the user. The results are referred to herein as variations 112 or outputs. In the illustrated example, the input is for generating an image with specific characteristics, and the variations panel 106 shows several variations 112. If the user selects one of the variations 112, the selection is then added to the canvas 108. Additional inputs may be entered in the prompt tool 110, and variations added to the canvas 108.

The content-generation tool is a platform that can generate multiple types of generative content customized for the user and the user's particular environment (e.g., assets, products, services, voice, style, and company of the user). Further, a template-creation tool allows the user to create custom templates to extend and customize the content-generation tool using no-code options that are easy to use. The prompt tool 110 allows the user to express creative ideas naturally and seamlessly integrate with brand assets.

It is noted that examples are presented with reference to marketing-purpose outputs, but the same principles may be used in other environments, such as the generation of documents, contracts, employee newsletters, manuals, instructions, etc. Therefore, the presented examples should not be interpreted as exclusive or limiting but rather illustrative.

GAI can create new content using existing text, audio files, or images. It enables computers to detect the underlying pattern related to the input to produce similar content. GAI may create this content using several techniques, such as Generative Adversarial Networks (GANs), transformers, and variational auto-encoders.

One of the challenges of GAI is that GAI algorithms need a large amount of training data to perform tasks successfully. Another challenge of GAI is unexpected outcomes, so the content-generation tool has to make sure that the generated results are high-quality and safe to present.

Figure 2:
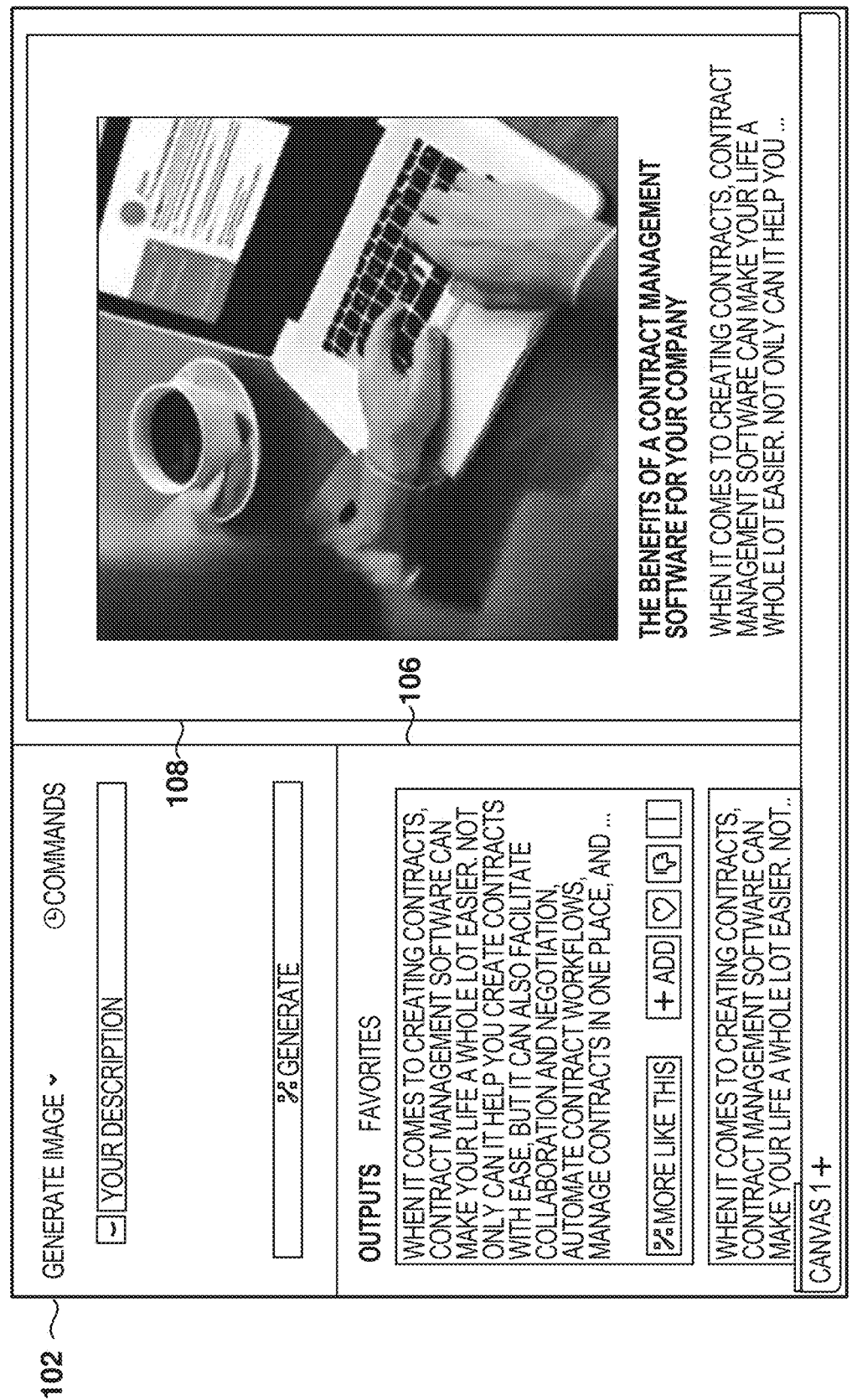
FIG. 2 is a screenshot of multimodal content generated by the content-generation tool, according to some examples.

FIG. 2 is a screenshot of multimodal content generated by the content-generation tool, according to some examples. In the illustrated example, a created image has been selected and is presented in the canvas 108.

Further, the user has entered in the prompt tool, "Please write a two-page blog post about the benefits of using contract management software. In your post, discuss how it can help create contracts with ease, facilitate collaboration and negotiation, automated contract workflows, manage contracts in one place, in and cover opportunities risk in trends."

The variations panel 106 shows multiple variations 112 for the blog, and the user has selected one of the generated variations to be added to the canvas 108. The different parts of the canvas are editable, including the results and the selected content added to the canvas 108. The process may be repeated, adding new variations (text, image, video) to the canvas. That is, the canvas may be generated through a sequence of content-generation requests until the desired outcome is achieved. This sequence of operations may be saved to create a template, as described in more detail below, and the user may then use the template in the future to generate similar types of material (e.g., a magazine advertisement, a poster for a conference, multimedia presentation).

The content-generation tool also provides a safety feature to ensure that the content generated is safe, meaning that the user's brand is protected from erroneous content (e.g., incorrect product images) and incorrect grammar or plagiarism. The content-generation tool provides a grammar checker and a plagiarism checker to ensure that the generated content is high-quality and safe. Further, the user can specify what type of content is acceptable and what type is not acceptable.

Furthermore, the content-generation tool includes an authenticity checker for the generated image to ensure the asset is always presented correctly. The content-generation tool provides complete brand control to the user and guarantees that the brand is protected.

Figure 3:
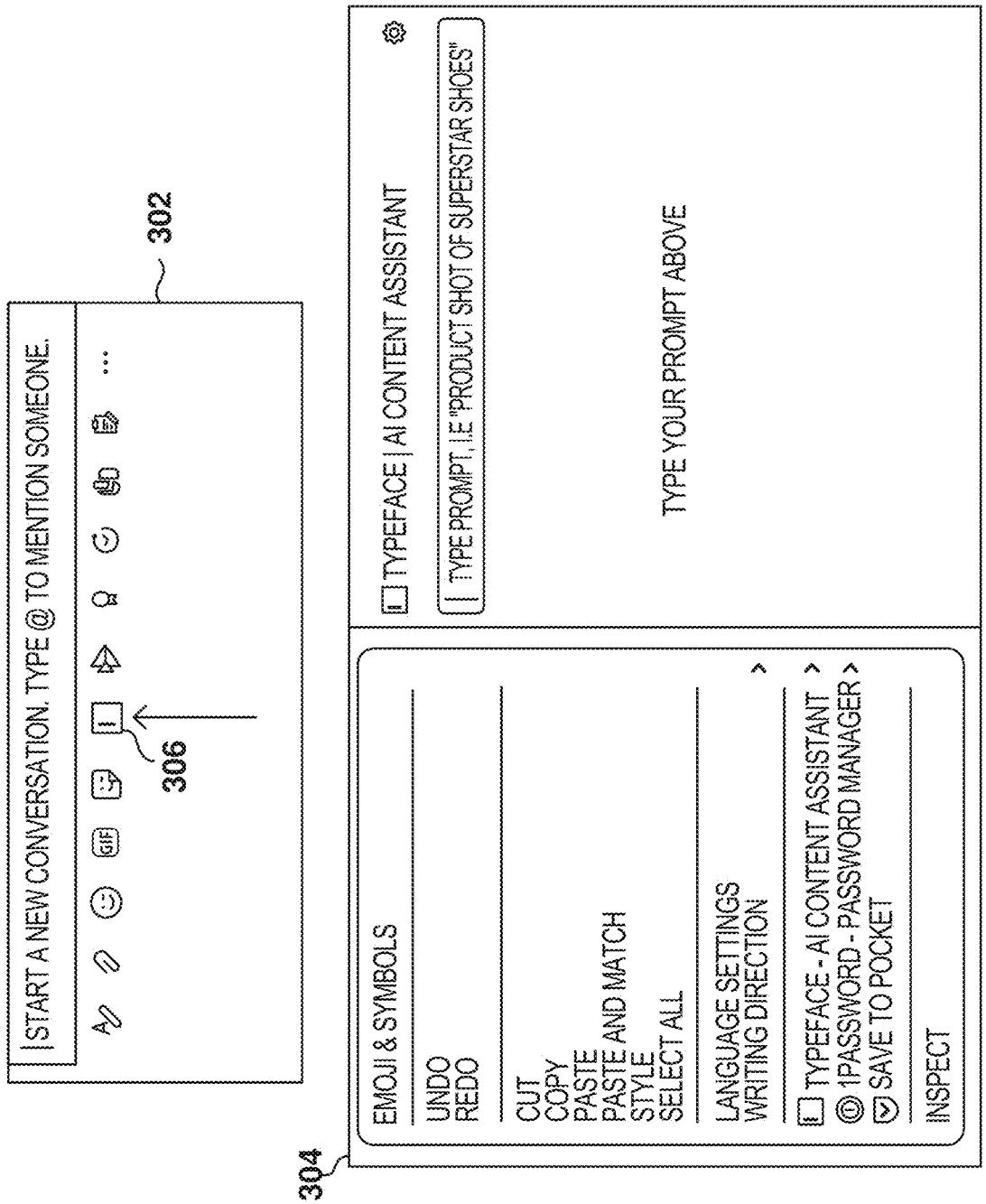
FIG. 3 illustrates the programmatic embedding of the content-generation tool in other programs, according to some examples.

FIG. 3 illustrates the programmatic embedding of the content-generation tool in other programs, according to some examples. The content-generation tool includes program hooks to include commands in other applications to invoke the content-generation tool and then include the content generated by the content-generation tool in the other applications.

The content-generation tool can be embedded in many types of tools, such as text processing tools, image processing tools, video processing tools, collaboration tools (e.g., Slack, MS Teams), browsers, etc.

For example, an icon 306 may be provided in a Graphical User Interface (GUI) 302 to invoke the content-generation tool. If the user selects the icon 306, then window 304 is presented with a version of the canvas for entering input in the prompt.

The content-generation tool may also provide different types of interfaces in the window 304. In some examples, the window 304 includes a conversational interface, referred to herein as the interactive assistant or interactive assistant tool, with a prompt field to enter questions and the responses to those questions, which may be multimodal, including text, graphics, videos, audio, etc. Some examples of the interactive assistant are provided below, such as in FIGS. 4-5.

The content-generation tool may be invoked with just a few lines of code embedded in the application. When the code is invoked, the code interacts with a server that provides the content-generation tool UI. Thus, embedding the content-generation tool in other programs is very easy. For example, the powerful prompt tool is provided with its interactive and AI-driven capabilities to generate GAI content.

In some examples, the interactive assistant is a plug-in for a webpage or an application, but other examples may utilize other types of tool integration. In some examples, a software development kit (SDK) is provided to integrate the interactive assistant with other software programs. In addition to the SDK integration, customers can annotate specific HTML fragments on their website with a data hashtag. These annotated fragments are referred to as "blocks." Upon loading the JavaScript of a webpage, the content-generation system scans the blocks on the webpage and checks if any of them have the block with the identifier assigned to the content-generation system. If a block is identified, the system dynamically communicates with the service to retrieve relevant content. The content can include various types of data, such as text segments, image segments, or other types of content.

Figure 4:
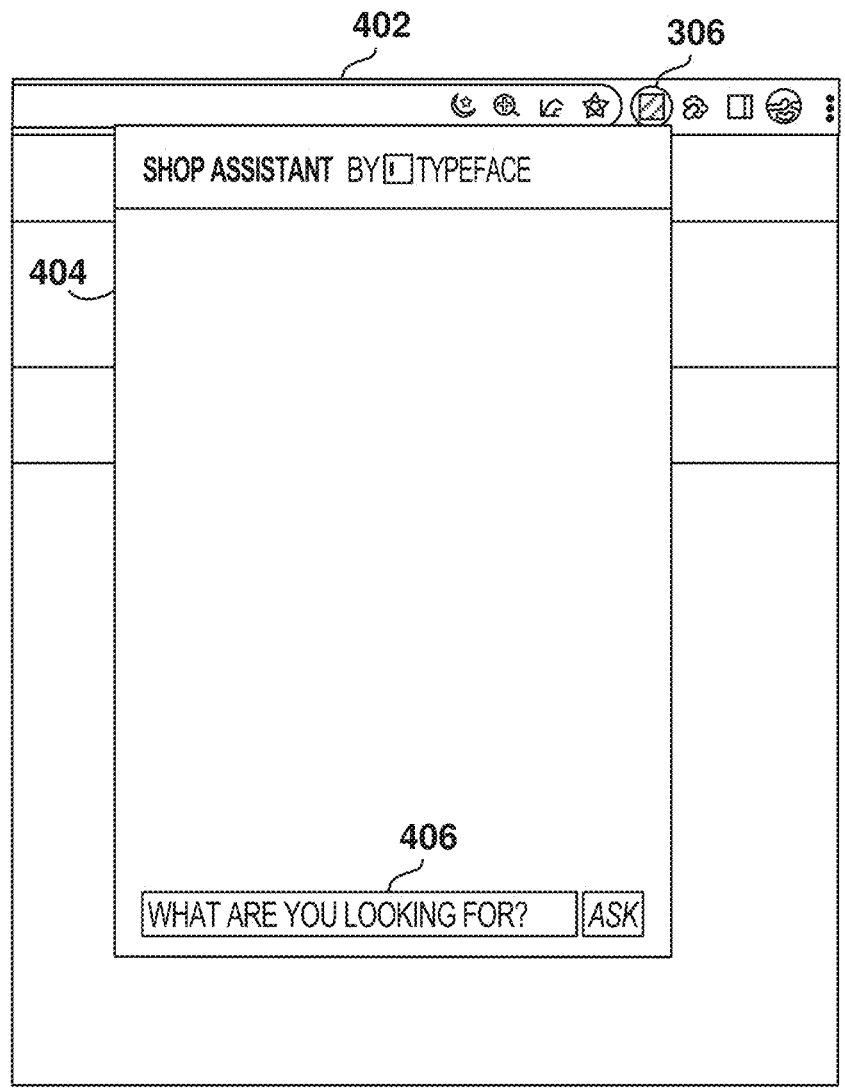
FIG. 4 shows the UI for the interactive assistant, according to some examples.

FIG. 4 shows the UI 402 for the interactive assistant 404, according to some examples. In this example, the interactive assistant 404 has been integrated within a website as a browser plug-in associated with icon 306, and the plug-in may be customized for the different types of browsers available.

A browser plug-in, also known as an add-on or an extension, is a software component that adds a specific feature or functionality to a web browser. Browser plug-ins can also add new features to the browser, such as ad blockers, password managers, social media integration, and the aforementioned interactive assistant 404.

The interactive assistant 404 includes a prompt field 406, a text input field where the user may enter requests, e.g., information about products on the website. Other embodiments may also include the option to enter other types of inputs, such as entering images (e.g., to find a product on the website that matches the image), voice (e.g., entering the request using voice), etc.

The content-generation system 1302 (described in more detail below with reference to FIG. 13) provides information that has been personalized for the user's specific characteristics, both in the interactive assistant 404 and the website. The content-generation system 1302 gets known information about the user, such as demographic characteristics (e.g., city of residence, age, gender) and the estimated intent of the user when interacting with the website (e.g., buying an anniversary present, buying equipment for a manufacturing facility, etc.)

Based on the user characteristics and information collected from prior interactions of users with the website, the content-generation system 1302 generates content using GAI to personalize the content on this website.

Figure 5:
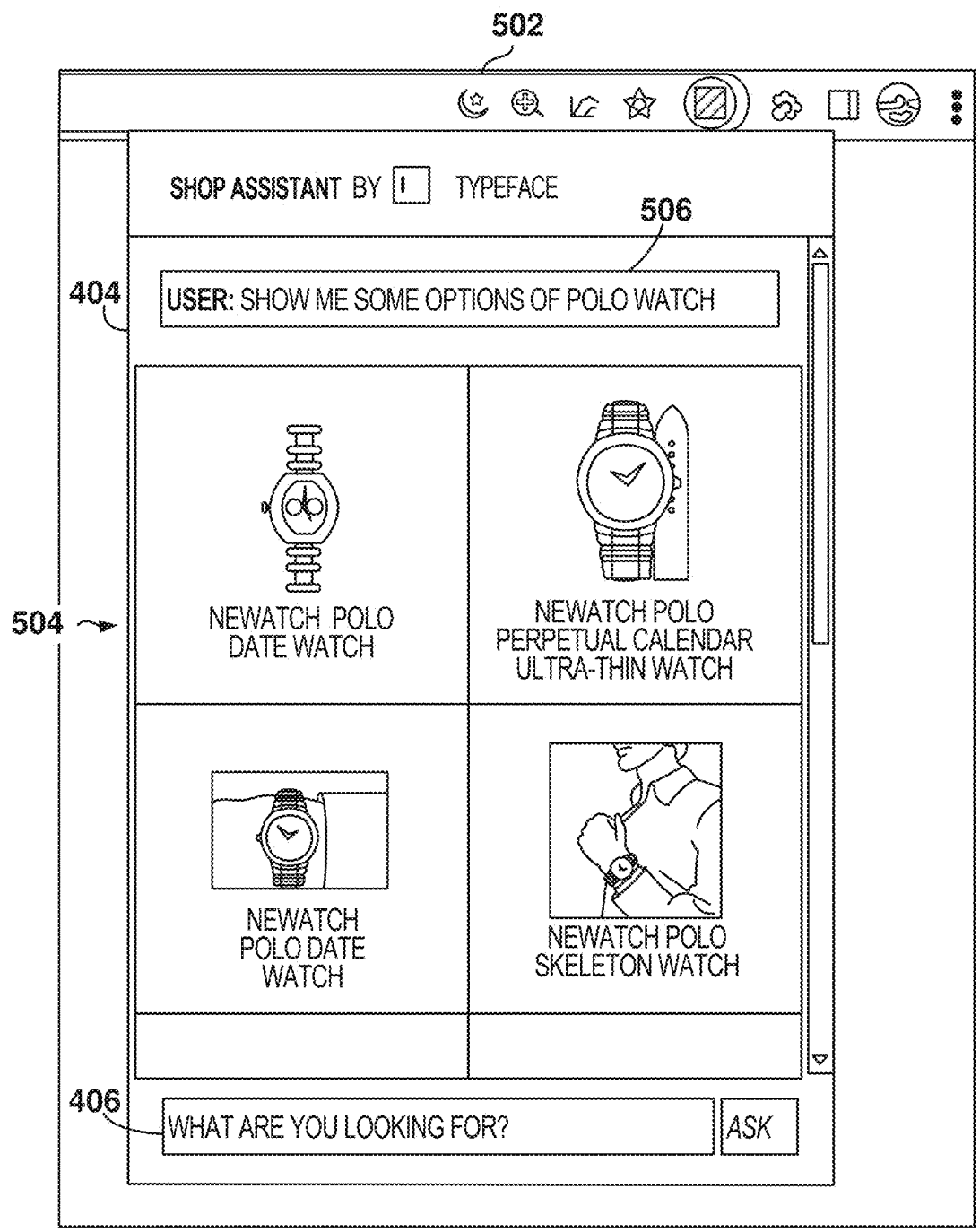
FIG. 5 shows the presentation of results from the website in the interactive assistant, according to some examples.

FIG. 5 shows the presentation of results from the website in the interactive assistant 404, according to some examples. In this example, the input 506 entered was "Show me some options of polo watch." The interactive assistant 404 has presented results 504 with several website products matching the request. In this case, the interactive assistant 404 acts as a shopping assistant as the user searches for product information on the website that sells watches.

The interactive assistant 404 is a conversational tool that allows the user to enter additional requests in the prompt field 406, and the responses will be tailored based on the request, the previous requests, and the previous results. In some examples, the user has the option to reset the conversation in the interactive assistant 404.

In some examples, the content of the website is indexed. For example, the website is divided into content blocks; the content blocks are embedded based on the semantics of the blocked content, and then the embeddings are indexed in what is called a content graph. When a search is performed, the content graph is analyzed to find content based on the request; that is, the semantic meaning of the request is matched against the embeddings to find the closest block with respect to meaning.

In operation, when a user interacts with the website, the user can request information for a specific product. The interactive assistant 404 analyzes the indexed content and presents the user with a curated list of products that match their request. The user can then select a product and obtain more detailed information.

The interactive assistant 404 employs a conversational interface, allowing users to ask specific questions about the product or seek personalized advice. For example, users can inquire about product details, such as the thickness of the case.

Furthermore, the interactive assistant 404 can adapt responses based on the user's profile and the conversation context. The interactive assistant 404 can act in different roles, such as a sales agent, a support specialist, a gift advisor, etc. For instance, if a user asks if a product is suitable as an anniversary gift, the assistant can analyze the product features and provide a personalized recommendation showing products considered good anniversary gifts.

Additionally, when integrated into a webpage, the interactive assistant 404 dynamically modifies the content based on user input, such as by adjusting the displayed images and text to align with the user's preferences and requirements. The content presented on the website may be generated automatically by the content-generation system 1302, as illustrated below with reference to FIG. 6.

The disclosed conversational, interactive assistant 404 provides an enhanced user experience by offering personalized product recommendations, detailed information, and adaptive content generation. It leverages the content graph and the conversational interface to deliver tailored assistance to users during their online journey on the website.

Figure 6:
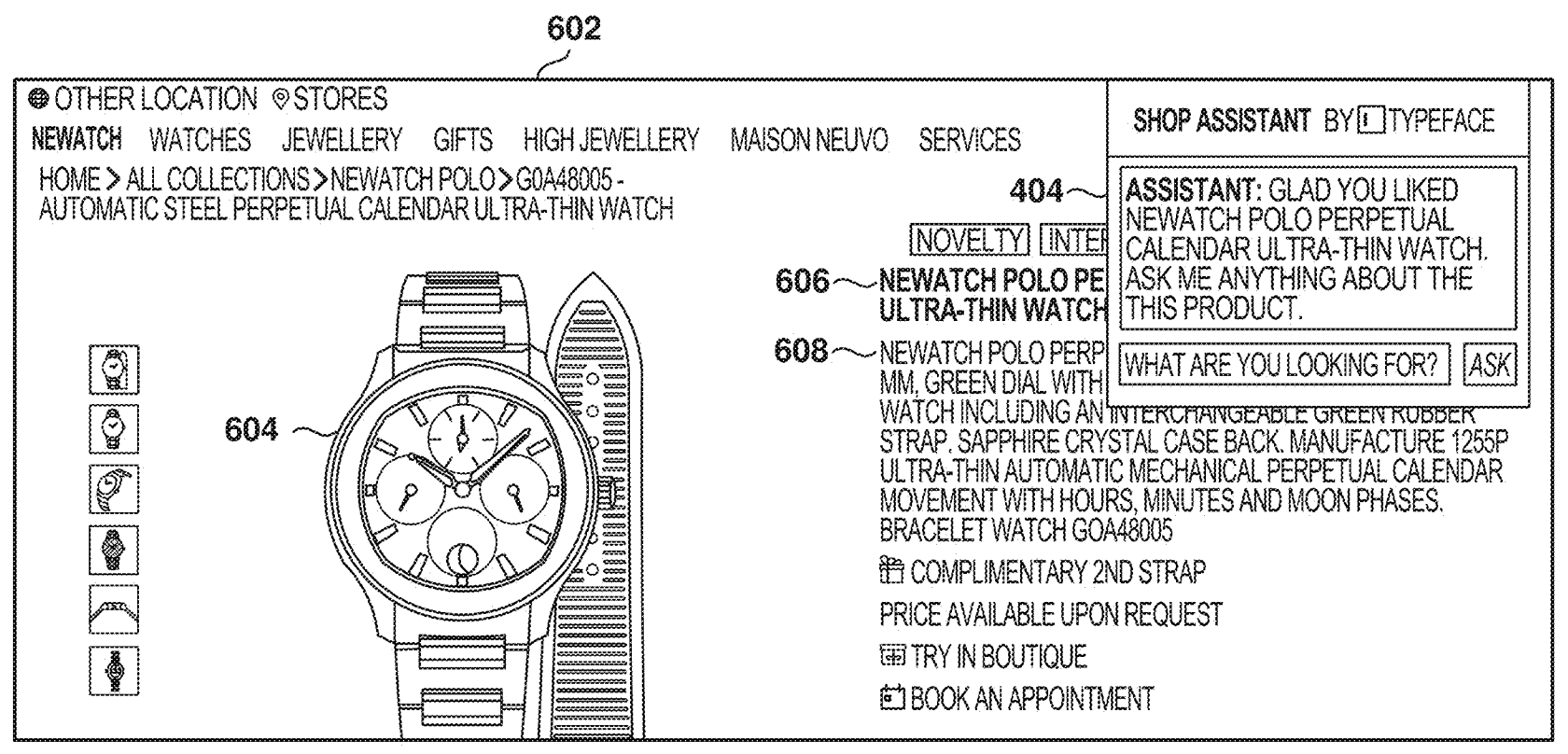

FIG. 6 shows a webpage 602 with computer-generated content, according to some examples. In this example, the user accessed the website for Newatch watches after searching for a specific Newatch watch. The interactive assistant 404 displayed the message, "Glad you liked the Newatch Polo Perpetual Calendar Ultra-Thin watch. Ask me anything about this product."

The webpage 602 is created based on the user profile, interaction with the website, and the interactive assistant 404. The webpage 602 may include different types of information, such as image 604, header 606, description 608, etc.

All these elements may be obtained from the website's indexed content or automatically generated for the user. For example, the image 604 may be an image from the website or a generated image to match the user's interest. For example, the user has been searching for a green gift, so the content-generation system 1302 may alter an image of the watch by changing the face of the watch and the strap to have green tones. In another example, an image may be generated of a man gifting a watch to his partner based on the intent that the user is looking for an anniversary gift.

The header 606 and the description 608 may also be generated and customized for the user. For example, if the user has asked questions about the weight of the watch, the weight of the watch may be included in the description 608.

Traditional solutions, such as social networks or newsfeeds, rely on man-made materials (e.g., different types of images, titles, product descriptions) to provide different views to users. That is, while displaying the webpage, the system has to select pre-existing material for rendering. Creating multiple versions of images, different titles, text descriptions, etc., is costly because it requires the developer's time. Also, as the number of options increases, so does the cost. In contrast, the present embodiments leverage user information to dynamically and automatically generate content most relevant to the individual user. Content can be automatically generated in real time by the content-generation system 1302 without requiring developers.

Some examples may use a mix of existing materials and automatically generated content. For example, the content-generation system 1302 may use an existing product description while creating a new title and a new image personalized for the user. The content-generation system 1302 includes a configuration tool that enables the client to configure which parts of the webpage may be static (e.g., material previously created) and which parts may be dynamic (e.g., generated in real time and personalized for the user).

Figure 7:
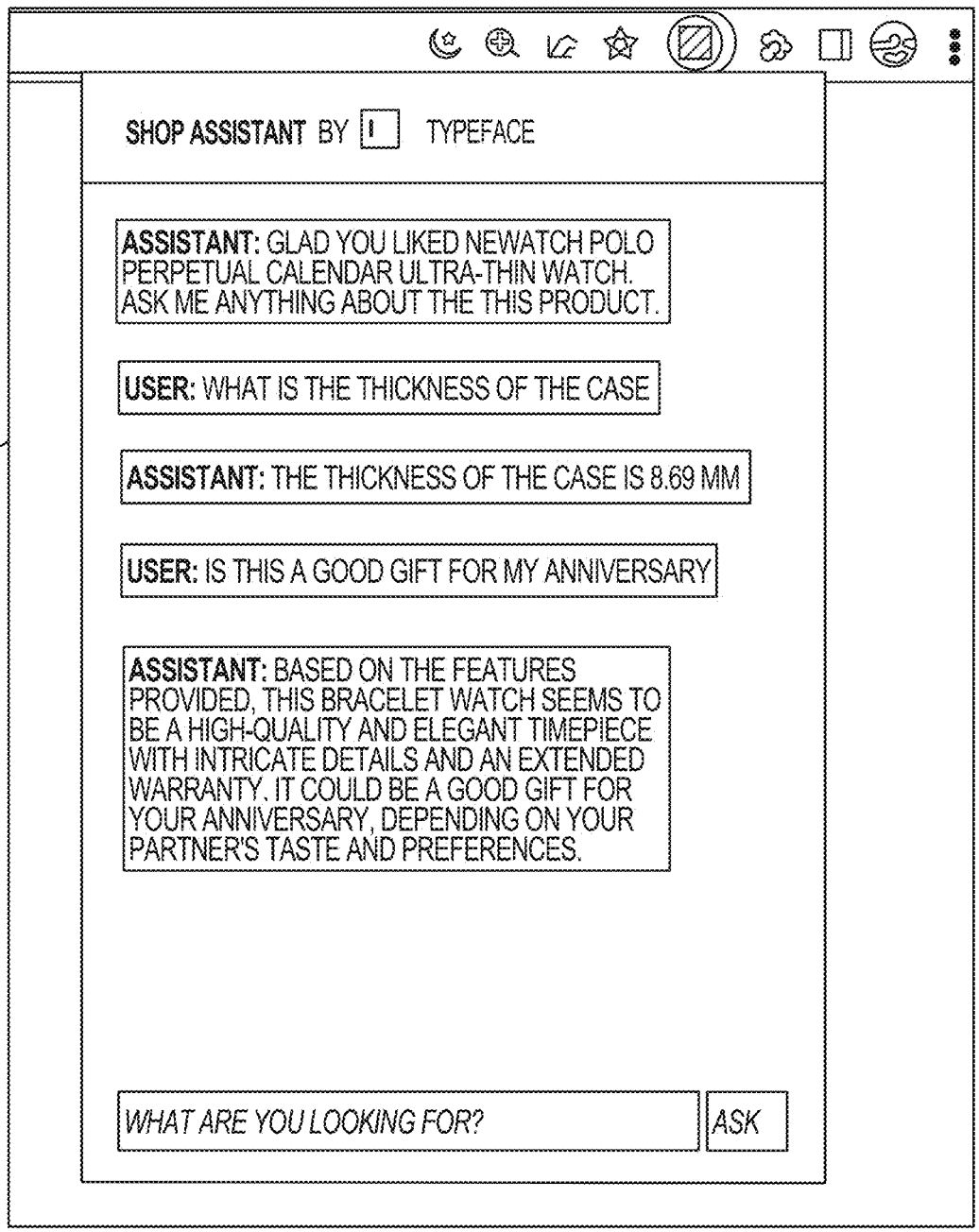
FIG. 7 illustrates a conversation with the interactive assistant, according to some examples.

FIG. 7 illustrates a conversation with the interactive assistant, according to some examples. The interactive assistant 404 shows a series of questions and responses, starting with the initial message from the assistant described above.

Afterward, the user asked, "what is the thickness of the case." The interactive assistant 404 checked the indexed content of the website and found the answer to the question: "The thickness of the case is 8.65 mm."

The user then asked, "Is this a good gift for my anniversary." The interactive assistant 404 then acts as a sales assistant and provides a reply, "Based on the features provided, this bracelet watch seems to be a high-quality and elegant timepiece with intricate details and an extended warranty. It could be a good gift for your anniversary, depending on your partner's taste and preferences."

FIG. 8 shows another webpage 802 with computer-generated content, according to some examples. The webpage 802 presents components generated by the content-generation system 1302, including an image 804, a title 806, and a product description 808.

The webpage 802 further includes a selectable option 810 named "Discover More." If the user selects this option, another webpage may be presented (an existing page, a page with generated content, or a mix of both) with more information about the product.

In some examples, the selectable option 810 may also be automatically generated, and the underlying link may not be for an existing URL (Uniform Resource Locator) but rather by a URL generated by the content-generation system 1302, and if the user selects this option, the content-generation system 1302 will generate the page that is customized for the user.

FIG. 9 shows examples of generated content for an email, according to some examples. The UI 902 includes four generated options for the content of an email.

The content-generation system 1302 may also be configured to work with other products or services. For example, suppose the marketer wants to generate an email for one or more customers configured in a customer-relationship tool (e.g., Salesforce). In that case, the content-generation system 1302 can extract the list of recipients and create blocks for the email. The blocks may be generated based on the content of the website and the experience of users accessing the website. The content will be personalized for the recipient.

In the illustrated example, the first option has the title "Leveraging State-of-the-Art AI Models to Boost Performance Marketing Results" and the email message content "As a Performance Marketing Manager at . . . ," etc. The four options are presented to a marketer sending emails to clients for a marketing campaign.

The marketer may select one of the campaign options or change different options for different target segments (e.g., existing customers, targeted new customers).

Figure 10:
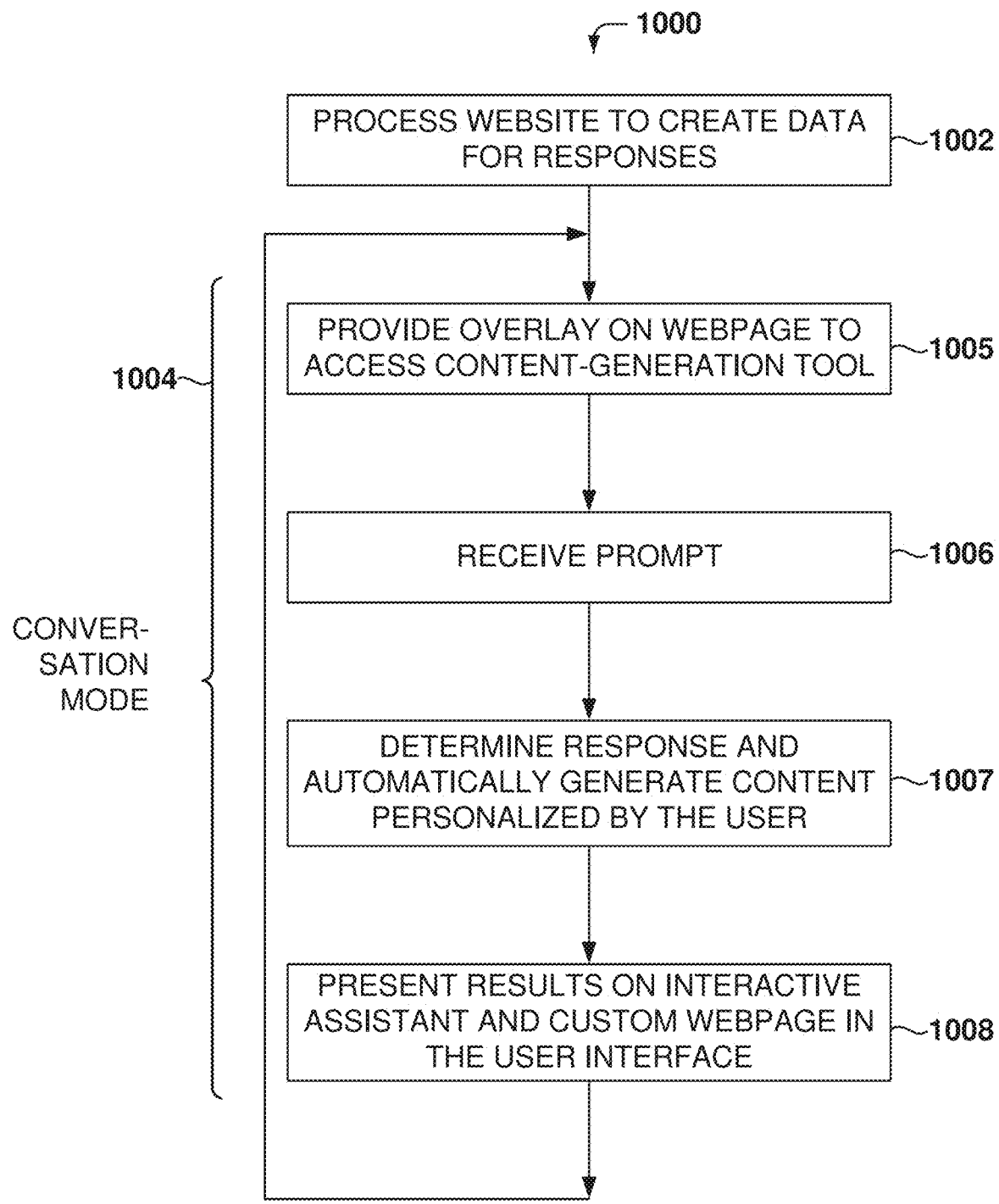
FIG. 10 is a flowchart of a method for processing website content according to some examples.

FIG. 10 is a flowchart of method 1000 for processing website content, according to some examples. While the various operations in this flowchart are presented and described sequentially, one of ordinary skill will appreciate that some or all of the operations may be executed in a different order, combined, omitted, or executed in parallel.

Operation 1002 is for processing the website to create data (e.g., an index) for responses to user requests. More details about operation 1002 are provided below with reference to FIG. 11.

From operation 1002, the method 1000 flows to operation 1005 to enter conversation mode 1004, which includes operations 1500-1008, corresponding to the interactions with the interactive assistant 404. At operation 1005, an overlay is provided on the webpage to access the interactive assistant 404.

From operation 1005, the method 1000 flows to operation 1006, where a prompt (e.g., a request) is received. At operation 1007, the content-generation system 1302 determines the response to the user for presentation in the interactive assistant 404 and automatically generates content for the webpage that is personalized for the user who submitted the request. As described above, the response may also include automatically generated content based on user information, website content, and other sources (e.g., content provided by a Large Language Model (LLM)). More information regarding processing the user request is provided below with reference to FIG. 12.

From operation 1007, the method 1000 flows to operation 1008 to present the results on the interactive assistant 404 and the custom webpage in the UI. The conversation mode 1004 may repeat by the method 1000 flowing back to operation 1005 to obtain a new request.

Figure 11:
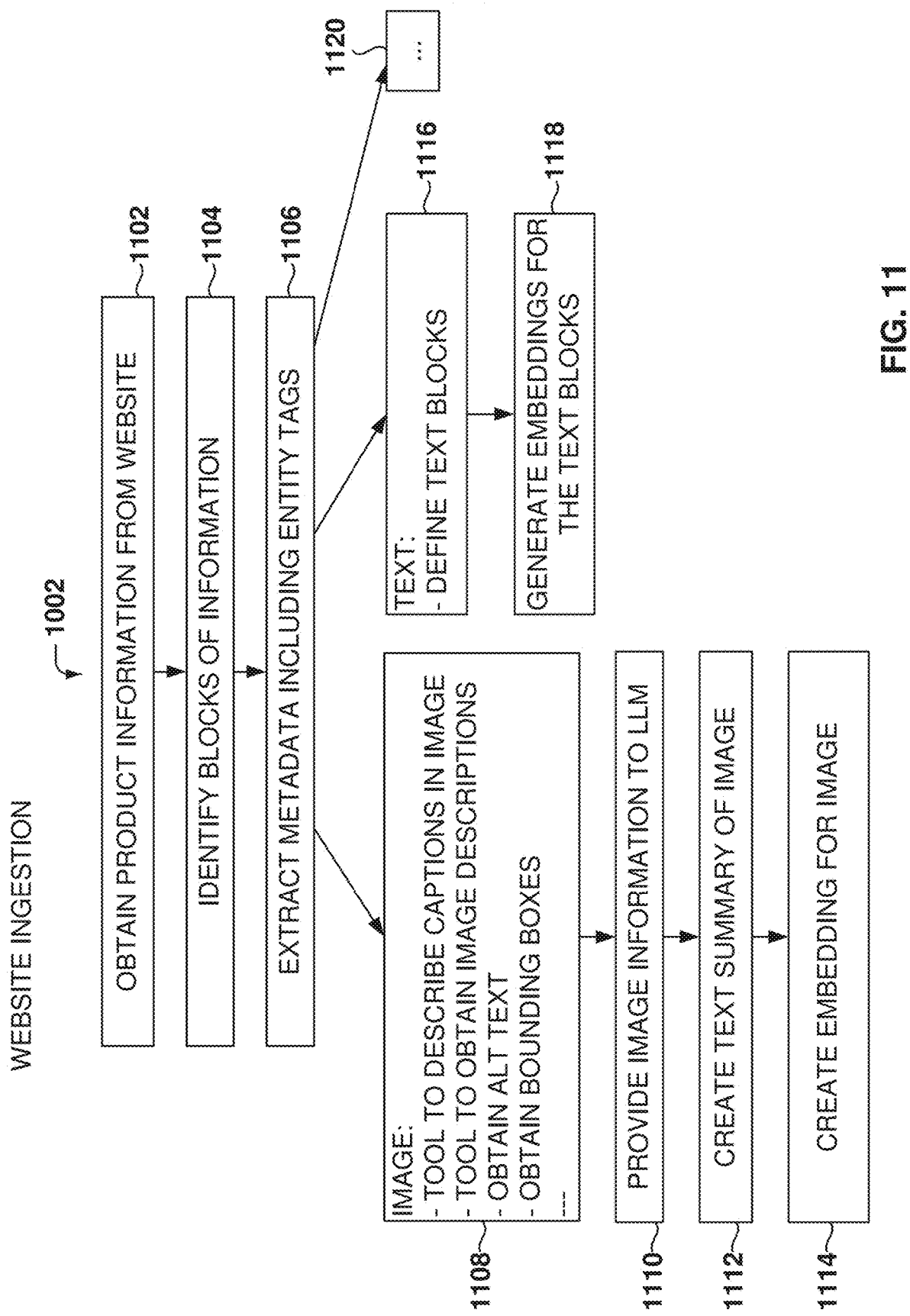
FIG. 11 is a flowchart of a method for processing a user request, according to some examples.

FIG. 11 is a flowchart of a method 1100 for processing a user request, according to some examples. While the various operations in this flowchart are presented and described sequentially, one of ordinary skill will appreciate that some or all of the operations may be executed in a different order, be combined or omitted, or be executed in parallel.

Operation 1102 is for obtaining product information (or service information) from the website. Although examples are described with reference to information about products, the same principles may be applied to websites that offer services.

From operation 1102, the method 1100 flows to operation 1104 to identify blocks of information from the website information. For example, the information for each product is assigned to the product (e.g., the product ID). The information is multimodal and could include text (e.g., product descriptions, technical specifications, product reviews), images, videos, PDFs, etc.

From operation 1104, the method 1100 flows to operation 1106 to extract additional metadata from the information, such as entity tags. The entity tag is an identifier associated with an entity of the website, where the entity may include a product, a service, a category of products or services, a family of products, a type of product (e.g., watch, ring, bracelet), a vendor associated with the product, etc. This metadata provides additional context or information about the blocks, such as the description of a product or the ID of the product associated with an image.

From operation 1106, the method 1100 flows to one of several operations based on the type of block that needs to be processed. For example, for an image, the method 1100 flows to operation 1108; for a block of text, the method 1100 flows to operation 1116, etc.

Multiple tools may be used to process images, and the results from these tools may be combined to provide a comprehensive image description. The first tool is an ML model that takes the image file as input and responds to questions about the images. The captions can be added to the image information by asking to provide captions in the image.

Another tool is a visual model that takes the image file as input and provides a description of the content of the image as output. Some examples of visual models include Azure AI Vision (which provides a list of descriptions with respective confidence scores as output), Google Cloud Vision, VILT, and LXMERT.

Another source of information for an image is the "alt text" associated with the image. Alt text, also known as alternative text, is a short description of an image that is displayed when the image cannot be loaded or is turned off.

Another source of information is to obtain the bounding boxes in the image. Bounding boxes are rectangular regions that enclose objects in the image. They are a common way to represent and label objects in images for computer vision tasks such as object detection, tracking, and classification. Bounding boxes are typically defined by two points: the top-left corner and the bottom-right corner. The coordinates of these points are used to define the size and location of the bounding box in the image. Bounding boxes can be used to represent objects of any shape or size. They can also be used to represent overlapping objects. For example, if an image contains a cat and a dog, two bounding boxes could represent the two animals, even though they overlap. Some tools that can be used to find bounding boxes include Azure AI Vision, Google Cloud Vision, Detectron2, YOLO, and Mask R-CNN.

From operation 1108, the method 1100 flows to operation 1110, where the image information is provided to the LLM, so the LLM uses this information during searches. That is, the image information is used as incremental-training data for the LLM so that the LLM can provide accurate answers about the products on the website.

To provide this information to the LLM, a prompt template may be used.

From operation 1110, the method 1100 flows to operation 1112 to create a text summary of the image based on the collected image information. In some examples, the summary is generated by the LLM using a prompt requesting the summary to combine the available information.

From operation 1112, the method 1100 flows to operation 1114 to create an embedding of the image with the image information collected. The blocks of information are then encoded into embeddings representing the product information. An embedding in machine learning is a dense numerical representation of a discrete object, such as a word, image, or user. Embeddings are often used to represent complex data types in a way that machine learning algorithms can quickly process.

Embeddings are typically learned through training a model on a large dataset. The model is trained to predict some data properties, such as the next word in a sentence or the category of an image. As the model is trained, it learns to represent the data in a useful way for making predictions. Once the model is trained, the embeddings can be used to represent the data in other machine-learning tasks. For example, word embeddings can be used to train a model to classify text or generate text. Image embeddings can be used to train a model to classify images or detect objects in images.

Embeddings are helpful because they allow machine learning algorithms to learn about the relationships between different objects. For example, word embeddings can learn that the words king and queen are related because they are both members of the same family. Image embeddings can learn that images of cats and dogs are related because they are both animals. Embeddings are also helpful because they can be used to represent data in a way that is efficient for machine learning algorithms to process. For example, word embeddings can be used to represent words as vectors of real numbers. This allows machine learning algorithms to perform operations on words, such as addition and subtraction, which can be helpful for tasks such as text classification and machine translation.

The embeddings generated are semantic embeddings, meaning that embeddings that are similar to each other (e.g., by comparing using cosine similarity) correspond to similar blocks of information.

In some examples, the embedding is created using a Hugging Face model. The Hugging Face model is a collection of open-source machine learning models trained on large text and code datasets. The models can be used for various natural language processing (NLP) tasks, such as text classification, question answering, and machine translation. Some examples of Hugging Face models include BERT, ROBERTa, DistilBERT, ALBERT, and T5.

In some examples, the image embeddings may also be generated by models that take the image itself and generate an embedding.

At operation 1116, the processing of text blocks is performed, including identifying the text blocks available from the website.

From operation 1116, the method 1100 flows to operation 1118 to generate the embeddings for the text blocks. Some tools to generate text embeddings include Hugging Face Transformers, spaCy, Gensim, Azure AI Text Analytics, and Google Cloud Natural Language.

Figure 12:
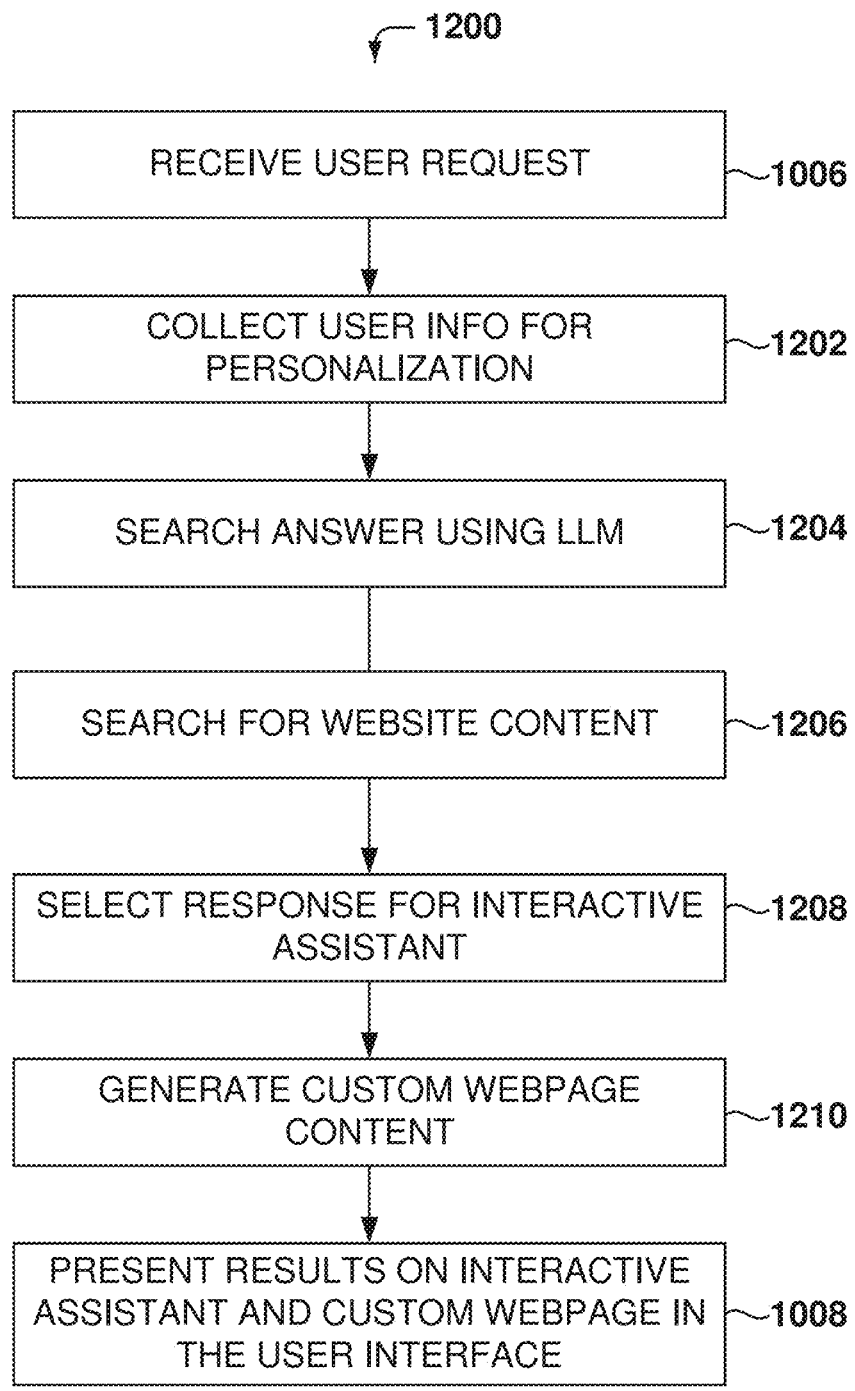
FIG. 12 is a flowchart of a method for processing a user request, according to some examples.

FIG. 12 is a flowchart of a method 1200 for processing a user request, according to some examples. While the various operations in this flowchart are presented and described sequentially, one of ordinary skill will appreciate that some or all of the operations may be executed in a different order, be combined or omitted, or be executed in parallel.

Operation 1006 is for receiving a user request, such as the one illustrated in FIG. 5. From operation 1006, the method 1200 flows to operation 1202 to collect user information to enable personalization of the results.

The user information may be gathered in several ways, and the information from the different sources may be combined. One source of information is the Urchin Tracking Module (UTM) parameters that are used to track the performance of ad campaigns. These UTM parameters are added to the end of URLs and allow the website owner to gather information, e.g., see where traffic is coming from, which campaigns drive the most clicks, which channels are most effective, etc.

Some common UTM parameters include the utm_source (name of the advertiser or website that is sending traffic to the website), utm_medium (marketing medium used to drive traffic), utm_campaign (name of the specific campaign that the ad is part of), utm_term (keyword used to trigger the ad), and utm_content (used to differentiate similar content or links within the same ad).

Another source of user information is obtained from the website owner, which is a client of the content-generation service. Clients may have audience segmentation tools that have metadata about their audiences, and this metadata is passed to the content-generation system 1302, such as the city where the user lives, the place where a product was bought, the list of products bought by the user, etc.

The user's Personally Identifiable Information (PII) is always protected to protect their privacy. PII is any information that can be used to identify an individual, directly or indirectly.

From operation 1202, the method 1200 flows to operation 1204 to search for an answer for the interactive assistant in response to the request.

Generative AI (GAI) is a type of artificial intelligence (AI) that can create new data, designs, or models based on existing data. A Large Language Model (LLM) is a type of GAI that can generate and understand text.

LLMs use a statistical model to analyze large amounts of text data and learn the patterns and connections between words and phrases. This allows them to generate new content, such as essays or articles, that are similar in style to a specific author or genre. LLMs are typically trained using a technique called self-supervised learning. This means that they are trained on data that is not labeled or annotated. Instead, the LLM learns to predict the next word in a sequence of words based on the already-seen words.

After the LLM has been trained on a large text dataset, it can be used to generate new text by providing a prompt as input. The LLM used its learned knowledge of language to generate the requested text as a result.

The LLM may be reconfigured using incremental training to add additional data to the LLM that may be used during the response phase. Incremental training allows LLMs to be trained on new data without having to start training from scratch. This is useful for LLMs deployed in real-world applications to better tailor the LLMs' responses to a particular working environment. There are several ways to implement incremental training for LLMs, such as fine-tuning and knowledge distillation.

The LLMs may be accessed via programmatic access, e.g., using an application programming interface (API) or via interactive tools that use LLMs. Some interactive LLM tools include Bard, ChatGPT, Copilot, SMMRY, Google Translate, and Jasper. The examples presented herein may be used with any of the existing LLMs.

In some examples, a prompt template is used to generate a prompt for the LLM. The prompt template includes fillable fields, which are filled with the request and the information about the user.

In some examples, the template includes fields for the product, such as "generate content describing this watch." Another field is to identify the audience (e.g., corresponding to the requester), including user characteristics. In some examples, another field is included with a history of the conversation in the interactive assistant 404 with the requester. Another field may specify the language for the response (e.g., "respond in English"). Another possible field may include the tone (e.g., "use a formal tone," "use a friendly tone," etc.).

In some examples, one or more fields may be included to describe some of the results obtained from searching the website, as described below in more detail with reference to operation 1206.

Once the prompt template is filled in to create a prompt, the prompt is input to the LLM, and a response is obtained from the LLM. For example, the LLM may answer, "The thickness of the case is 8.65 mm." The answer from the LLM is stored by the content-generation system 1302, so the conversation history may be updated for future use.

From operation 1204, the method 1200 flows to operation 1206 to search the website for the content relevant to the request. In some examples, three sources of information are considered: the embeddings of website blocks, text summarizations of the blocks in the website, and named entity tags of products or services described in the website. That is, the request is used to search for those three sources of information.

In some examples, an embedding of the request is generated, and this embedding is used to find similarity with the website embeddings, that is, find one or more blocks that are semantically close to the request because the embeddings are close to each other (e.g., by comparing them using cosine similarity).

In some examples, the website's content is also indexed (e.g., based on keywords such as product descriptions), and the index is used to search for information.

In some examples, the results of the search of the website are ranked using ranked fusion by providing weights to each of the content categories (the embeddings of website blocks, text summarizations of the blocks in the website, and the named entity tags) and then selecting the results with the highest weighted scores.

In some examples, an elastic keyword search is performed to find the results and corresponding scores. The elastic search works by storing data in an inverted index, a data structure that maps each unique word in a document to a list of all the documents that contain that word. The document is broken into individual words and phrases, and each word and phrase is added to the inverted index. When a search is performed, the elastic search tool looks up the search terms in the inverted index and returns a list of the documents that contain those terms.

From operation 1206, the method 1200 flows to operation 1208, where the response for the interactive assistant is selected. In some example payments, the response selected is the response provided by the LLM. In other examples, the response may also include information obtained from the website.

From operation 1208, the method 1200 flows to operation 1210 where custom webpage content is created based on the results from the search. As described above, for each block, a template is selected (e.g., a template for titles, a template for images, a template for product descriptions), and then the template is filled in with the relevant values. For example, the template may include fields for the type of content to be generated (e.g., a title, a description, an image, a video, an audio message), the product description, the audience information, the user request, the website content, tone, etc.

After the prompt is created from the template, the prompt is fed into the GAI tool, and the GAI tool returns the required webpage block. The webpage blocks may be of different types, such as text, images, audio, video, etc. For text-based blocks, the LLM may be used to generate the text. For images, GAI image-creation tools may be used. GAI audio-creation tools may be used for audio. GAI video-creation tools may be used for video.

After the webpage content is created, the different blocks are combined to create the webpage for presentation, which includes formatting each block based on formatting rules (e.g., titles have a larger font than product descriptions). The webpage may include a combination of existing and generated website content.

From operation 1210, the method 1200 flows to operation 1008 to present the results previously obtained in the interactive assistant 404 and the webpage.

Figure 13:
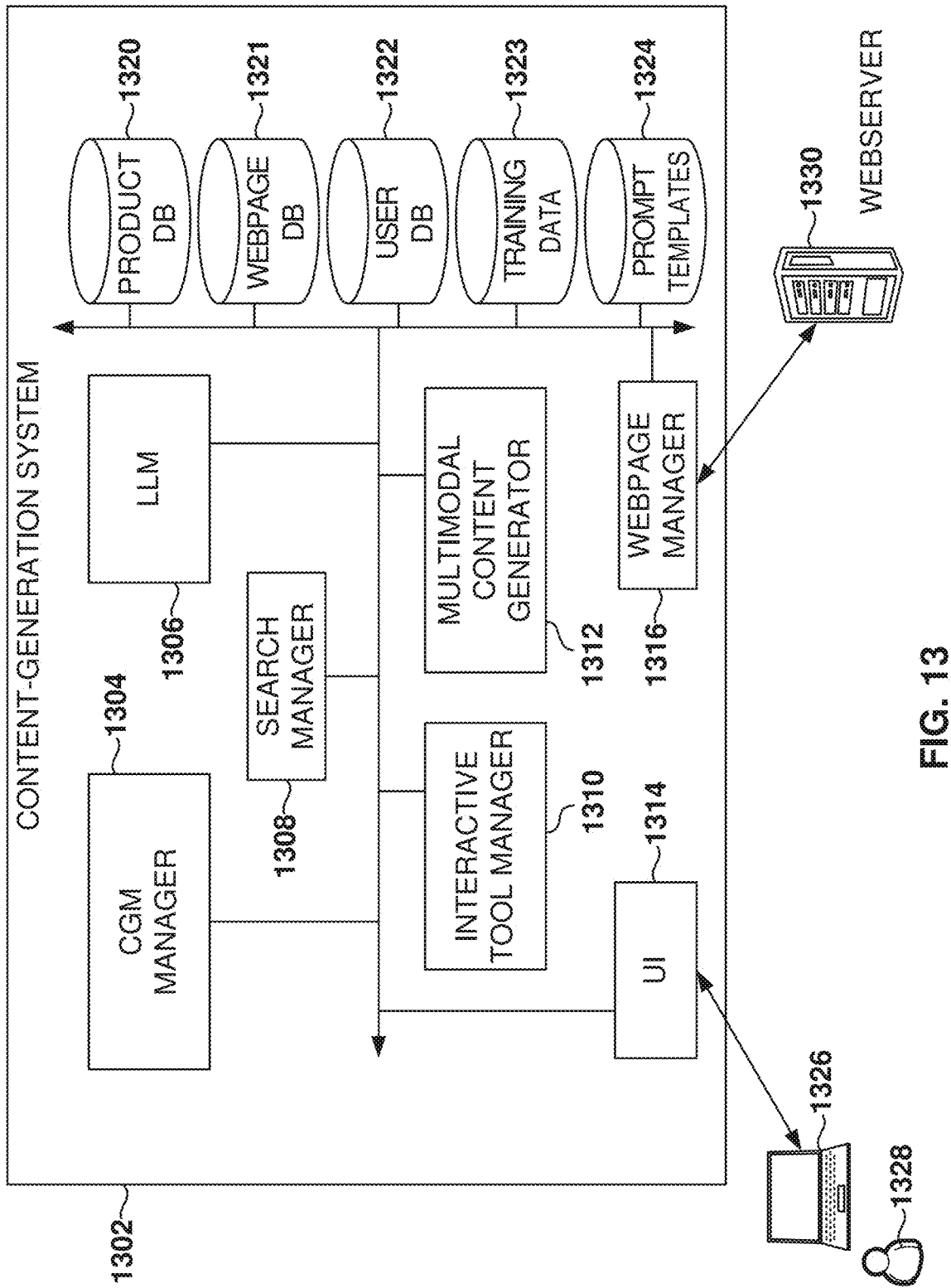
FIG. 13 illustrates a content-generation system (CGM) for implementing examples, according to some examples.

FIG. 13 illustrates a content-generation system 1302 for implementing examples. A content generation system 1302 includes a CGM manager 1304, the LLM 1306, a search manager 1308, an interactive tool manager 1310, a multimodal content generator 1312, a UI 1314, a webpage manager 1316, and a plurality of databases (DB) that include a product DB 1320, a webpage DB 1321, a user DB 1322, training data 1323, and prompt templates 1324.

Although a single system is presented, the person skilled in the art will readily appreciate that implementation may be distributed over one or more devices and be implemented over a network.

The CGM manager 1304 manages the interactions between the different modules of the content-generation system 1302. The LLM 1306 is the LLM used for generating content and obtaining information. In some examples, the LLM 1306 is outside the content-generation system 1302 and may be accessed over a network. In some examples, multiple LLMs may be used.

The search manager 1308 performs searches in response to user requests. The interactive tool manager 1310 implements the interactive assistant 404 and interfaces with the UI 1314 to present the tool on a display. The multimodal content generator 1312 generates content for the presentation on the webpage, and the UI 1314 interacts with a user device 1326, associated with the user (e.g., requester) 1328, to present the UI on the display of the user device 1326.

The webpage manager 1316 interfaces with a webserver 1330 that hosts a customer's website and gets the website's content as needed for content indexing and processing as well as presentation on the user device 1326.

The product DB 1320 includes information on products the customer is selling and includes the products discovered by exploring the website, although additional product information may also be added by the customer to the product DB 1320.

The webpage DB 1321 includes the information obtained from the website (e.g., webpages and embeddings of webpage blocks), and the user DB 1322 includes user information. The training data 1323 includes data for training the LLM 1306, and the prompt templates 1324 includes the prompt templates used for creating prompts for the LLM 1306.

The content-generation system 1302 can generate personalized content on the fly, with low latency, appearing to the user as if the content previously existed. If the content would take a long time to generate, then the user would appreciate that the website was slow and unresponsive, decreasing customer satisfaction and the probability of selling products on the website.

Figure 14:
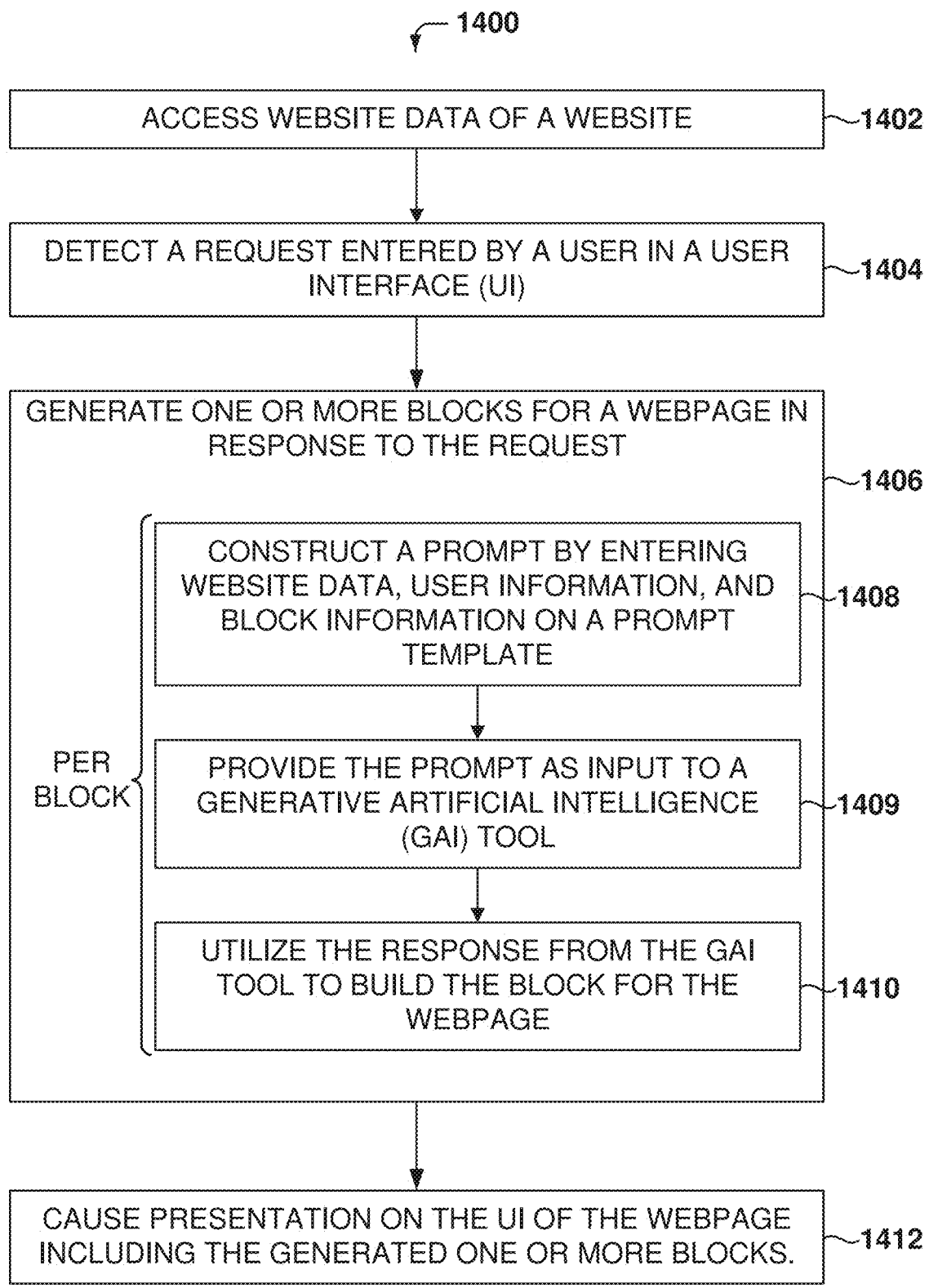
FIG. 14 is a flowchart of a method for providing a personalized view of webpages and an interactive assistant for exploring website content, according to some examples.

FIG. 14 is a flowchart of a method for providing a personalized view of webpages and an interactive assistant for exploring website content, according to some examples. While the various operations in this flowchart are presented and described sequentially, one of ordinary skill will appreciate that some or all of the operations may be executed in a different order, be combined or omitted, or be executed in parallel.

Operation 1402 is for accessing the website data of a website.

From operation 1402, the method 1400 flows to operation 1404 for detecting a request entered by a user in a user interface (UI).

From operation 1404, the method 1400 flows to operation 1406 to generate one or more blocks for a webpage in response to the request. Generating each block comprises operations 1408-1409.

Operation 1408 is for constructing a prompt by entering website data, user information, and block information on a prompt template.

From operation 1408, the method 1400 flows to operation 1409 for providing the prompt as input to a Generative Artificial Intelligence (GAI) tool.

From operation 1409, the method 1400 flows to operation 1410 to utilize the response from the GAI tool to build the block for the webpage.

After generating the one or more blocks, the method 1400 flows from operation 1406 to operation 1412 for causing presentation on the UI of the webpage, including the generated one or more blocks.

In some examples, accessing website data further comprises obtaining product information from the website, identifying blocks of pages in the website, and retrieving one or more entity tags for each block.

In some examples, accessing the website data further comprises generating semantic embeddings for blocks in the webpages of the website.

In some examples, the block is an image block for an image, where generating semantic embeddings for the image block comprises extracting captions from the image, extracting a description of the image, obtaining alt-text for the image, obtaining one or more bounding boxes for the image, and generating the semantic embedding for the image block based on the captions, the description, the alt-text, and the one or more bounding boxes.

In some examples, generating one or more blocks further comprises generating a request embedding for the request and selecting the one or more blocks with semantic embeddings closest to the request embedding.

In some examples, the method 1200 further comprises providing an interactive assistant on the webpage in the UI, where the request is entered in the interactive assistant.

In some examples, the method 1200 further comprises creating a prompt based on the request and user information, providing the prompt as input to a Large Language Model (LLM), and presenting the response from the LLM in the interactive assistant.

In some examples, the one or more blocks comprise an image block, where the GAI tool is an image-generation tool.

In some examples, the one or more blocks comprise at least one image block and at least one text block.

In some examples, the method 1200 further comprises, after accessing the website data, performing incremental training for a Large Language Model (LLM) with text data from the website data.

Another general aspect is for a system that includes a memory comprising instructions and one or more computer processors. The instructions, when executed by the one or more computer processors, cause the one or more computer processors to perform operations comprising: accessing website data of a website; detecting a request entered by a user in a user interface (UI); generating one or more blocks for a webpage in response to the request, wherein generating each block comprises: constructing a prompt by entering website data, user information, and block information on a prompt template; providing the prompt as input to a Generative Artificial Intelligence (GAI) tool; and utilizing the response from the GAI tool to build the block for the webpage; and causing presentation on the UI of the webpage including the generated one or more blocks.

In yet another general aspect, a non-transitory machine-readable storage medium (e.g., a non-transitory storage medium) includes instructions that, when executed by a machine, cause the machine to perform operations comprising: accessing website data of a website; detecting a request entered by a user in a user interface (UI); generating one or more blocks for a webpage in response to the request, wherein generating each block comprises: constructing a prompt by entering website data, user information, and block information on a prompt template; providing the prompt as input to a Generative Artificial Intelligence (GAI) tool; and utilizing the response from the GAI tool to build the block for the webpage; and causing presentation on the UI of the webpage including the generated one or more blocks.

Figure 15:
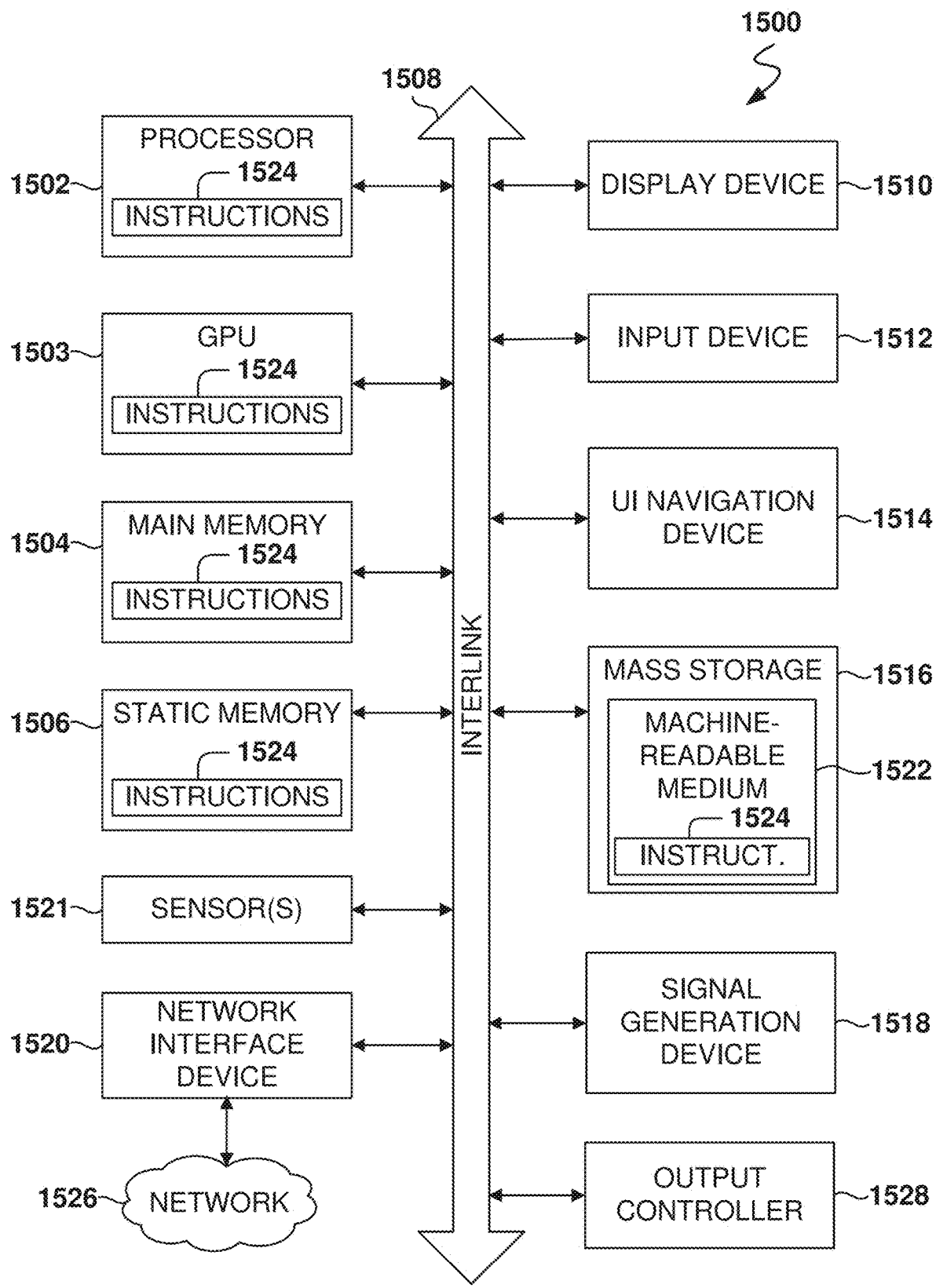
FIG. 15 is a block diagram illustrating an example of a machine upon or by which one or more example process examples described herein may be implemented or controlled.

FIG. 15 is a block diagram illustrating an example of a machine 1500 upon or by which one or more example process embodiments described herein may be implemented or controlled. In some examples, the machine 1500 may operate as a standalone device or be connected (e.g., networked) to other machines. In a networked deployment, the machine 1500 may operate in the capacity of a server machine, a client machine, or both in server-client network environments. In an example, the machine 1500 may act as a peer machine in a peer-to-peer (P2P) (or other distributed) network environment. Further, while only a single machine 1500 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 1500 (e.g., computer system) may include a hardware processor 1502 (e.g., a central processing unit (CPU), a hardware processor core, or any combination thereof), a graphics processing unit (GPU 1503), a main memory 1504, and a static memory 1506, some or all of which may communicate with each other via an interlink 1508 (e.g., bus). The machine 1500 may further include a display device 1510, an alphanumeric input device 1512 (e.g., a keyboard), and a user interface (UI) navigation device 1514 (e.g., a mouse). In an example, the display device 1510, alphanumeric input device 1512, and UI navigation device 1514 may be a touch screen display. The machine 1500 may additionally include a mass storage device 1516 (e.g., drive unit), a signal generation device 1518 (e.g., a speaker), a network interface device 1520, and one or more sensors 1521, such as a Global Positioning System (GPS) sensor, compass, accelerometer, or another sensor. The machine 1500 may include an output controller 1528, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1516 may include a machine-readable medium 1522 on which one or more sets of data structures or instructions 1524 (e.g., software) embodying or utilized by any of the techniques or functions described herein. The instructions 1524 may also reside, completely or at least partially, within the main memory 1504, within the static memory 1506, within the hardware processor 1502, or the GPU 1503 during execution thereof by the machine 1500. For example, one or any combination of the hardware processor 1502, the GPU 1503, the main memory 1504, the static memory 1506, or the mass storage device 1516 may constitute machine-readable media.

While the machine-readable medium 1522 is illustrated as a single medium, the term "machine-readable medium" may include a single medium or multiple media (e.g., a centralized or distributed database and associated caches and servers) configured to store one or more instructions 1524.

The term "machine-readable medium" may include any medium that is capable of storing, encoding, or carrying instructions 1524 for execution by the machine 1500 and that causes the machine 1500 to perform any one or more of the techniques of the present disclosure or that is capable of storing, encoding, or carrying data structures used by or associated with such instructions 1524. Non-limiting machine-readable medium examples may include solid-state memories and optical and magnetic media. For example, a massed machine-readable medium comprises a machine-readable medium 1522 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1524 may be transmitted or received over a communications network 1526 using a transmission medium via the network interface device 1520.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is provisionally claimed is:

1. A computer-implemented method comprising:
   accessing website data of a website;
   detecting a request entered by a user in a user interface (UI) for a webpage in the website;
   generating one or more blocks for the webpage in response to the request, wherein generating each block comprises:
   constructing a prompt based on the website data, user information, block information, and a prompt template, the prompt comprising descriptive text for desired results, the prompt template including fillable fields, wherein constructing the prompt comprises filling the fillable fields with information based on the website data and the user information;
   providing the prompt, comprising website data, user information, and block information, as input to a Generative Artificial Intelligence (GAI) tool;
   utilizing the response from the GAI tool to build the block for the webpage; and
   adding the block built by the GAI tool to the webpage; and
   causing presentation on the UI of the webpage including the generated one or more blocks.

2. The method as recited in claim 1, wherein accessing the website data further comprises:
   obtaining product information from the website;
   identifying blocks of pages in the website; and
   retrieving one or more entity tags for each block, wherein the website data comprises the product information, the identified blocks of pages in the website, and the one or more entity tags for each block.

3. The method as recited in claim 1, wherein accessing the website data further comprises:
   generating semantic embeddings for blocks in the webpages of the website.

4. The method as recited in claim 3, wherein the block is an image block for an image, wherein generating the semantic embeddings for the image block comprises:
   extracting captions from the image;
   extracting a description of the image;
   obtaining alt-text for the image;
   obtaining one or more bounding boxes for the image; and
   generating the semantic embedding for the image block based on the captions, the description, the alt-text, and the one or more bounding boxes.

5. The method as recited in claim 3, wherein generating the one or more blocks further comprises:
   generating a request embedding for the request; and
   selecting the one or more blocks with the semantic embeddings closest to the request embedding.

6. The method as recited in claim 1, further comprising:
   providing an interactive assistant on the webpage in the UI, wherein the request is entered in the interactive assistant.

7. The method as recited in claim 6, further comprising:
   creating a prompt based on the request and the user information;
   providing the prompt as input to a Large Language Model (LLM); and
   presenting the response from the LLM in the interactive assistant.

8. The method as recited in claim 1, wherein the one or more blocks comprise an image block, wherein the GAI tool is an image-generation tool.

9. The method as recited in claim 1, wherein the one or more blocks comprise at least one image block and at least one text block.

10. The method as recited in claim 1, further comprising:
    after accessing the website data, performing incremental training for a Large Language Model (LLM) with text data from the website data.

11. A system comprising:
    a memory comprising instructions; and
    one or more computer processors, wherein the instructions, when executed by the one or more computer processors, cause the system to perform operations comprising:
    accessing website data of a website;
    detecting a request entered by a user in a user interface (UI) for a webpage in the website;
    generating one or more blocks for the webpage in response to the request, wherein generating each block comprises:
    constructing a prompt based on the website data, user information, block information, and a prompt template, the prompt comprising descriptive text for desired results, the prompt template including fillable fields, wherein constructing the prompt comprises filling the fillable fields with information based on the website data and the user information;

providing the prompt, comprising website data, user information, and block information, as input to a Generative Artificial Intelligence (GAI) tool;

utilizing the response from the GAI tool to build the block for the webpage; and adding the block built by the GAI tool to the webpage; and causing presentation on the UI of the webpage including the generated one or more blocks.

12. The system as recited in claim 11, wherein accessing the website data further comprises:

obtaining product information from the website;

identifying blocks of pages in the website; and retrieving one or more entity tags for each block, wherein the website data comprises the product information, the identified blocks of pages in the website, and the one or more entity tags for each block.

13. The system as recited in claim 11, wherein accessing the website data further comprises:

generating semantic embeddings for blocks in the webpages of the website.

14. The system as recited in claim 13, wherein the block is an image block for an image, wherein generating the semantic embeddings for the image block comprises:

extracting captions from the image;

extracting a description of the image;

obtaining alt-text for the image;

obtaining one or more bounding boxes for the image; and generating the semantic embedding for the image block based on the captions, the description, the alt-text, and the one or more bounding boxes.

15. The system as recited in claim 13, wherein generating the one or more blocks further comprises:

generating a request embedding for the request; and selecting the one or more blocks with the semantic embeddings closest to the request embedding.

16. A non-transitory machine-readable storage medium including instructions that, when executed by a machine, cause the machine to perform operations comprising:

accessing website data of a website;

detecting a request entered by a user in a user interface (UI) for a webpage in the website;

generating one or more blocks for the webpage in response to the request, wherein generating each block comprises:

constructing a prompt based on the website data, user information, block information, and a prompt template, the prompt comprising descriptive text for desired results, the prompt template including fillable fields, wherein constructing the prompt comprises filling the fillable fields with information based on the website data and the user information;

providing the prompt, comprising website data, user information, and block information, as input to a Generative Artificial Intelligence (GAI) tool;

utilizing the response from the GAI tool to build the block for the webpage; and adding the block built by the GAI tool to the webpage; and causing presentation on the UI of the webpage including the generated one or more blocks.

17. The non-transitory machine-readable storage medium as recited in claim 16, wherein accessing the website data further comprises:

obtaining product information from the website;

identifying blocks of pages in the website; and retrieving one or more entity tags for each block, wherein the website data comprises the product information, the identified blocks of pages in the website, and the one or more entity tags for each block.

18. The non-transitory machine-readable storage medium as recited in claim 16, wherein accessing the website data further comprises:

generating semantic embeddings for blocks in the webpages of the website.

19. The non-transitory machine-readable storage medium as recited in claim 18, wherein the block is an image block for an image, wherein generating the semantic embeddings for the image block comprises:

extracting captions from the image;

extracting a description of the image;

obtaining alt-text for the image;

obtaining one or more bounding boxes for the image; and generating the semantic embedding for the image block based on the captions, the description, the alt-text, and the one or more bounding boxes.

20. The non-transitory machine-readable storage medium as recited in claim 18, wherein generating the one or more blocks further comprises:

generating a request embedding for the request, and selecting the one or more blocks with the semantic embeddings closest to the request embedding.

* * * * *